(12) United States Patent
Hosaka

(10) Patent No.: US 7,224,802 B2
(45) Date of Patent: May 29, 2007

(54) WIRELESS COMMUNICATION DEVICE, AND METHOD FOR CONTROLLING THE SAME, WHICH AUTHENTICATES PARTNER DEVICE WHEN CONNECTING THERETO

(75) Inventor: Chisei Hosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 10/354,640

(22) Filed: Jan. 30, 2003

(65) Prior Publication Data

US 2003/0149875 A1    Aug. 7, 2003

(30) Foreign Application Priority Data

| Feb. 1, 2002 | (JP) | ............................. 2002-025062 |
| Feb. 1, 2002 | (JP) | ............................. 2002-025063 |
| Feb. 1, 2002 | (JP) | ............................. 2002-025064 |
| Jan. 14, 2003 | (JP) | ............................. 2003-005812 |

(51) Int. Cl.
*H04L 9/00* (2006.01)
*H04L 9/32* (2006.01)
*H04B 7/00* (2006.01)
*H04B 15/00* (2006.01)

(52) U.S. Cl. .................. 380/274; 726/2; 455/41.2; 455/502

(58) Field of Classification Search ................ None
See application file for complete search history.

(56) References Cited

U.S. PATENT DOCUMENTS

| 2001/0019956 A1 | 9/2001 | Tada ........................... 455/434 |
| 2002/0009995 A1 | 1/2002 | Fujii ........................... 455/435 |
| 2002/0187793 A1* | 12/2002 | Papadimitriou et al. .... 455/458 |
| 2003/0038731 A1* | 2/2003 | Sako et al. ............ 340/825.26 |
| 2004/0242250 A1* | 12/2004 | Sasai et al. ................ 455/502 |

FOREIGN PATENT DOCUMENTS

| EP | 1 069 758 A2 | 6/2000 |
| JP | 1-218223 | 8/1989 |
| JP | 2-7751 | 1/1990 |
| JP | 2-260831 | 10/1990 |
| JP | 2-309847 | 12/1990 |
| JP | 03-210838 | 9/1991 |
| JP | 11-146061 | 5/1999 |
| JP | 2000/134663 | 5/2000 |
| JP | 2001/145163 | 5/2001 |
| JP | 2001/189689 | 7/2001 |
| JP | 2001/313983 | 11/2001 |
| JP | 2001313983 | * 11/2001 |
| JP | 2002/027560 | 1/2002 |
| WO | WO 01/41378 | 6/2001 |

OTHER PUBLICATIONS

Japanese Office Action issued in counterpart Japanese Patent Appl. 2003-005812, dated Jun. 8, 2005, along with English translation.

(Continued)

*Primary Examiner*—Gilberto Barron, Jr.
*Assistant Examiner*—Kristin D. Sandoval
(74) *Attorney, Agent, or Firm*—Morgan & Finnegan LLP

(57) ABSTRACT

When having been set into, for example, a mode for registering a Bluetooth device address (BD_ADDR) in accordance with the Bluetooth Standard or a mode for registering a Personal Identification Number (PIN) code in accordance with the Bluetooth Standard, a wireless communication device of the present invention can be link-connected with a partner device without performing authentication on the partner device, to receive and register information from the partner device.

Furthermore, if a BD_ADDR of a partner device is already registered, the wireless communication device of the present invention can be link-connected with the partner device without performing authentication of the partner device.

15 Claims, 12 Drawing Sheets

OTHER PUBLICATIONS

English Abstract for JP 2000/134663 (Item B).
English Abstract for JP 2001/145163 (Item C).
Partial English Translation (¶[0034]) for JP 2001/145163 (Item C).
English Abstract for JP 2001/189689 (Item D).
English Translation (Full) of JP 2001/313983 (Item E).
English Abstract for JP 2002/027560 (Item F).
English Abstract for JP 03-210838 (Item G).
Partial English Translation for JP 03-210838 (Item G).
English Abstract for JP 11-146061 (Item H).

* cited by examiner

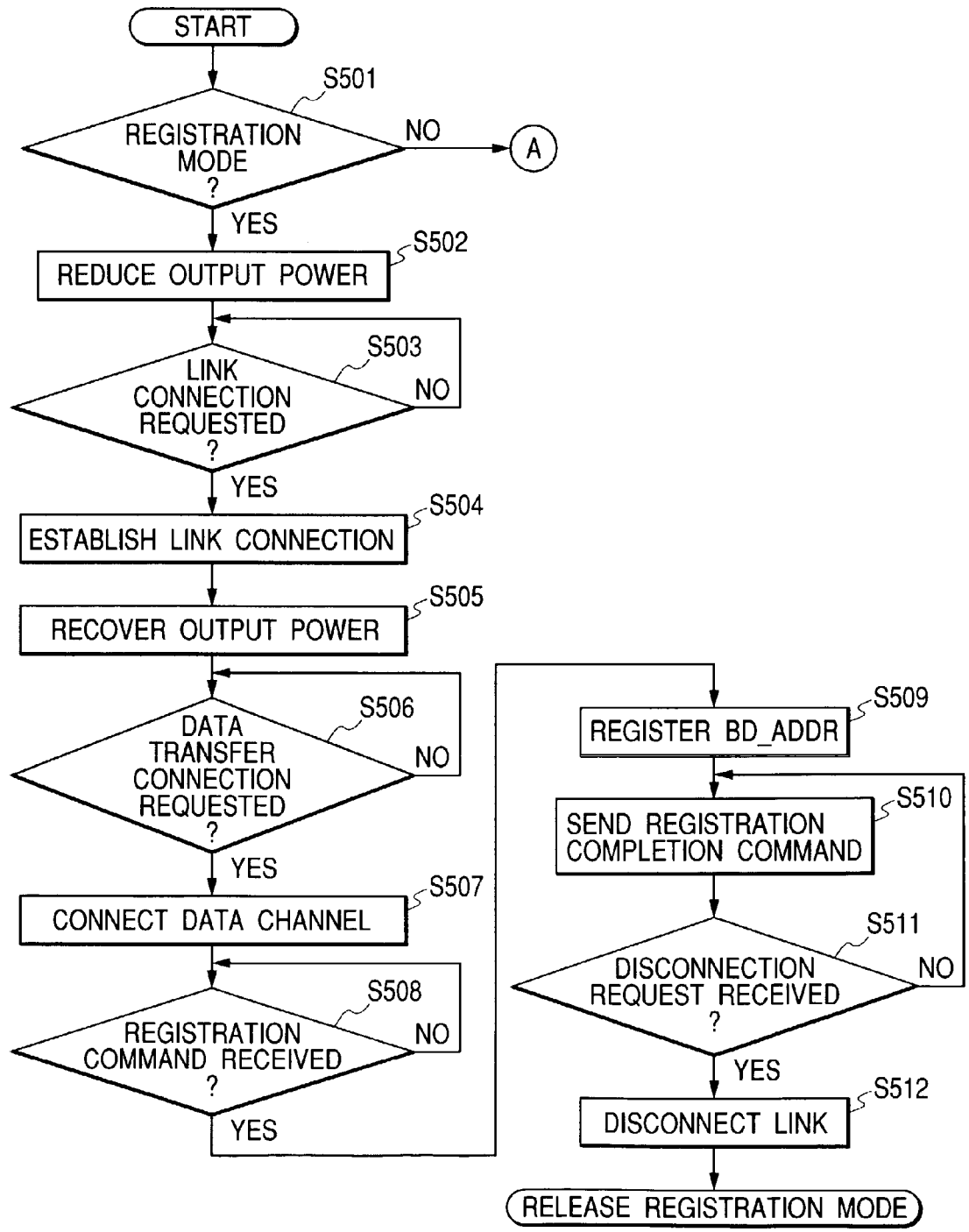

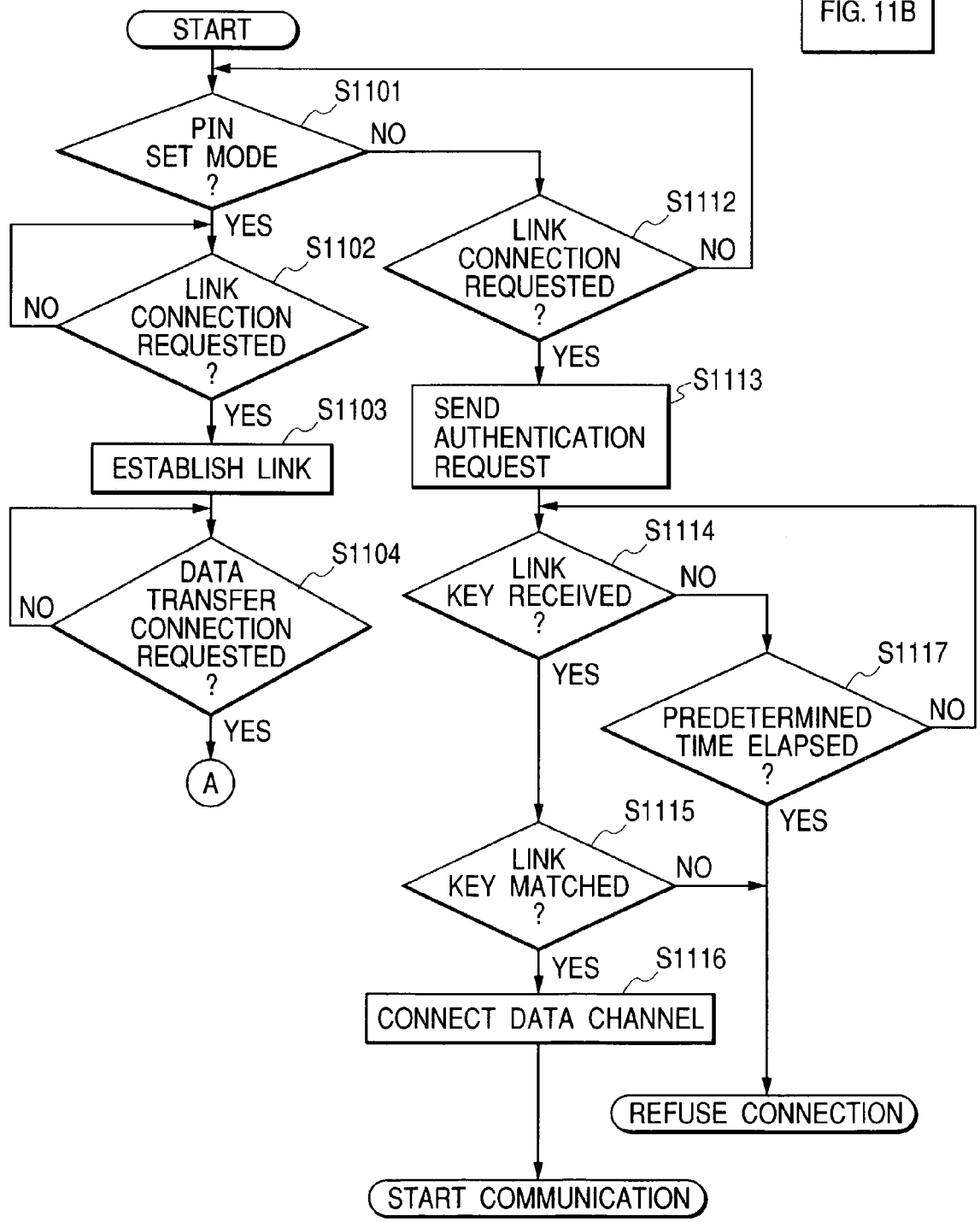

WIRELESS COMMUNICATION DEVICE, AND METHOD FOR CONTROLLING THE SAME, WHICH AUTHENTICATES PARTNER DEVICE WHEN CONNECTING THERETO

BACKGROUND OF THE INVENTION

1. Field of the Invention

The present invention relates to a wireless communication device, and a method for controlling the same, which authenticates a partner device when connecting thereto.

2. Description of the Related Art

There is a Bluetooth communication method available which employs a spread spectrum system in a frequency band of 2.4 $GH_z$, as one of wireless data communication methods.

A device which is engaged in Bluetooth communication is assigned a unique Bluetooth device address (hereinafter called "BD_ADDR"). Accordingly, in the case of authentication before start of communication between Bluetooth communication devices, link keys are created by using this BD_ADDR and a Personal Identification Number (PIN) code entered by a user and then exchanged for mutual authentication, thus enabling communication. This authentication processing prevents communication between devices which have detected a mismatch of PIN codes entered mutually, thus insuring security.

For example, between wireless communication devices such as a personal computer or a PDA provided with a user key-input unit, when connection is requested, the same PIN codes are entered to each other through the keys, thus performing authentication processing for the connection.

On the other hand, between communication devices such as a print device not provided with a key-input unit for entering of PIN codes or provided with only such a key-input unit that it is difficult to enter PIN codes therewith, a PIN code may be preset in a memory beforehand, so that this PIN code can be entered by a partner device when connection is requested, to perform authentication.

This system, however, has a problem that communication is impossible if this preset PIN code is forgotten.

Furthermore, this system has such a security problem that malicious connection may be established by a malicious third party when he has happened to know the preset PIN code.

Moreover, even with a device having a key-input unit through which a PIN code can be entered, if key input is difficult to perform, connection may take much time to be established or be refused by a timer.

SUMMARY OF THE INVENTION

It is an object of the present invention to improve security in communication.

It is another object of the present invention to improve security management and also enable simple connection with a partner device.

It is a further object of the present invention to improve convenience of a device.

The other objects of the present invention will be apparent from the following description and the accompanying drawings.

To achieve these objects, the present invention provides a wireless communication device which comprises:

authentication means which, prior to link-connection with a partner device, performs authentication with the partner device;

setting means which sets the wireless communication device into a predetermined set mode; and communication means which link-connects to the partner device without performing authentication by means of the authentication means, according to whether the wireless communication device has been set into the predetermined set mode by the setting means.

Furthermore, the present invention provides a wireless communication device control method which comprises:

an authentication step for, prior to link-connection with a partner device, performing authentication with the partner device;

a setting step for setting a wireless communication device into a predetermined mode; and a communication step for link-connecting to the partner device without performing authentication in the authentication step, according to whether the wireless communication device has been set into the predetermined set mode in the setting step.

DETAILED DESCRIPTION OF THE INVENTION

FIRST EMBODIMENT

Figure 1:
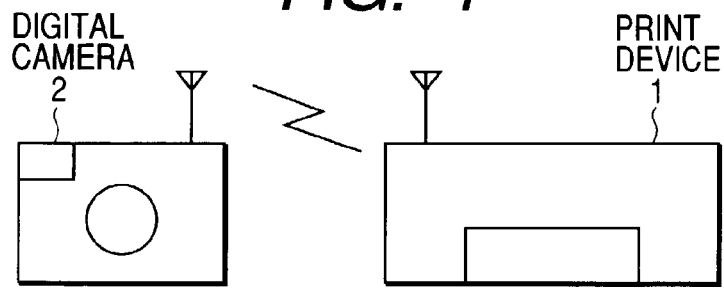
FIG. 1 is a diagram for showing a print device and a digital camera according to an embodiment of the present invention.

FIG. 1 is a overall diagram for showing a print device 1 and a digital camera 2 according to a first embodiment of the present invention.

Figure 2:
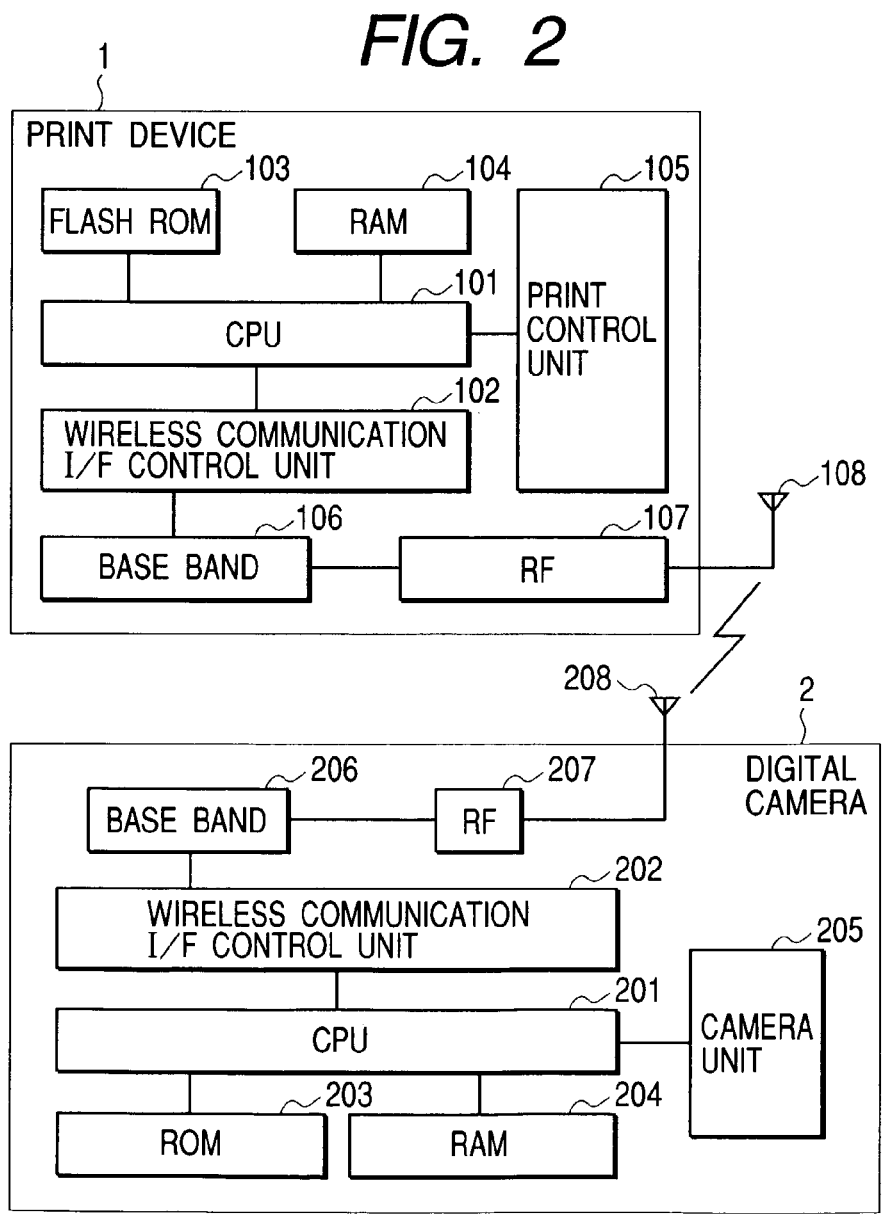
FIG. 2 is a block diagram for showing the print device and the digital camera according to the embodiment of the present invention.

FIG. 2 is a block diagram for showing a specific example of the print device 1 and the digital camera 2.

The print device 1 has a print control unit 105 which prints data, a CPU101, a flash ROM103, a RAM104, and a wireless unit comprised of a wireless communication I/F control unit 102 which performs Bluetooth communication, a base band unit 106, an RF unit 107, and an antenna 108.

A signal received through the antenna 108 is demodulated by the RF unit 107 and output to the base band unit 106. The base band unit 106 performs error correction processing on the demodulated data and, if the data is decided in accordance with a processing result to have been received normally, outputs it to the wireless communication I/F control unit 102 and, otherwise, requests for re-transmission.

In addition, transmit data from the wireless communication I/F control unit 102 is added an error correction symbol etc. by the base band unit 106 to be converted into data having a predetermined data format, which is then output to the RF unit 107.

The RF unit 107 demodulates the output data and sends it through the antenna 108 to the digital camera 2. Furthermore, the RF unit 107 can alter output power of the print device 1; in fact, it alters the output power of the print device 1 (transmission power) in accordance with an output-power alteration instruction sent from the wireless communication I/F control unit 102.

The wireless communication I/F control unit 102 analyzes data output by the base band unit 106, to perform control processing on such operations as link-connection negotiation in Bluetooth communication, service search response, connection negotiation in each of protocol hierarchies, data transfer, and flow control.

Such transferred data as print data or image data is analyzed in accordance with a control program stored in the flash ROM103, converted into a control signal by the CPU101, and output to the print control unit 105 to be printed.

The flash ROM103, which permanently stores a program to control the print device 1, a variety of operation tables, etc., serves as a non-volatile memory to store registered device information such as BD_ADDR and such data as a PIN code. It is to be noted that the flash ROM103 may be replaced by such a non-volatile memory as a ROM or an EEPROM.

Furthermore, the print device 1 is equipped with a power key to control power ON/OFF operations and a simple switch (not shown) such as a RESUME key to release an error.

The digital camera 2 has a CPU201 for photographing, a ROM203, a RAM204, a camera unit 205, and a wireless unit comprised of a wireless communication I/F control unit 202 for Bluetooth communication, a base band unit 206, an RF unit 207, and an antenna 205; in this configuration, the digital camera 2 sends a variety of kinds of print data and control data to and receives them from the print device 1 through the wireless unit in Bluetooth communication.

Furthermore, the digital camera 2 has a key-input device (not shown) and an output device (not shown) such as an LCD monitor and so is capable of key input and monitor output.

It is to be noted that every Bluetooth device has a Bluetooth device address (BD_ADDR) which is peculiar to the device. When a link-connection request is sent from the digital camera 2 to the print device 1, the digital camera 2 requests the print device 1 for link-connection by notifying it of a BD_ADDR, a Class_of_Device (device class) which indicates the type of a link-connection requesting device, and a Link_Type (link type) which indicates a communication method. In this embodiment, by registering this BD_ADDR in the print device 1, device connection is simplified and also security is improved in the case of connection for providing of services.

Next, operations are described for registering a BD_ADDR in the print device 1.

Figure 3:
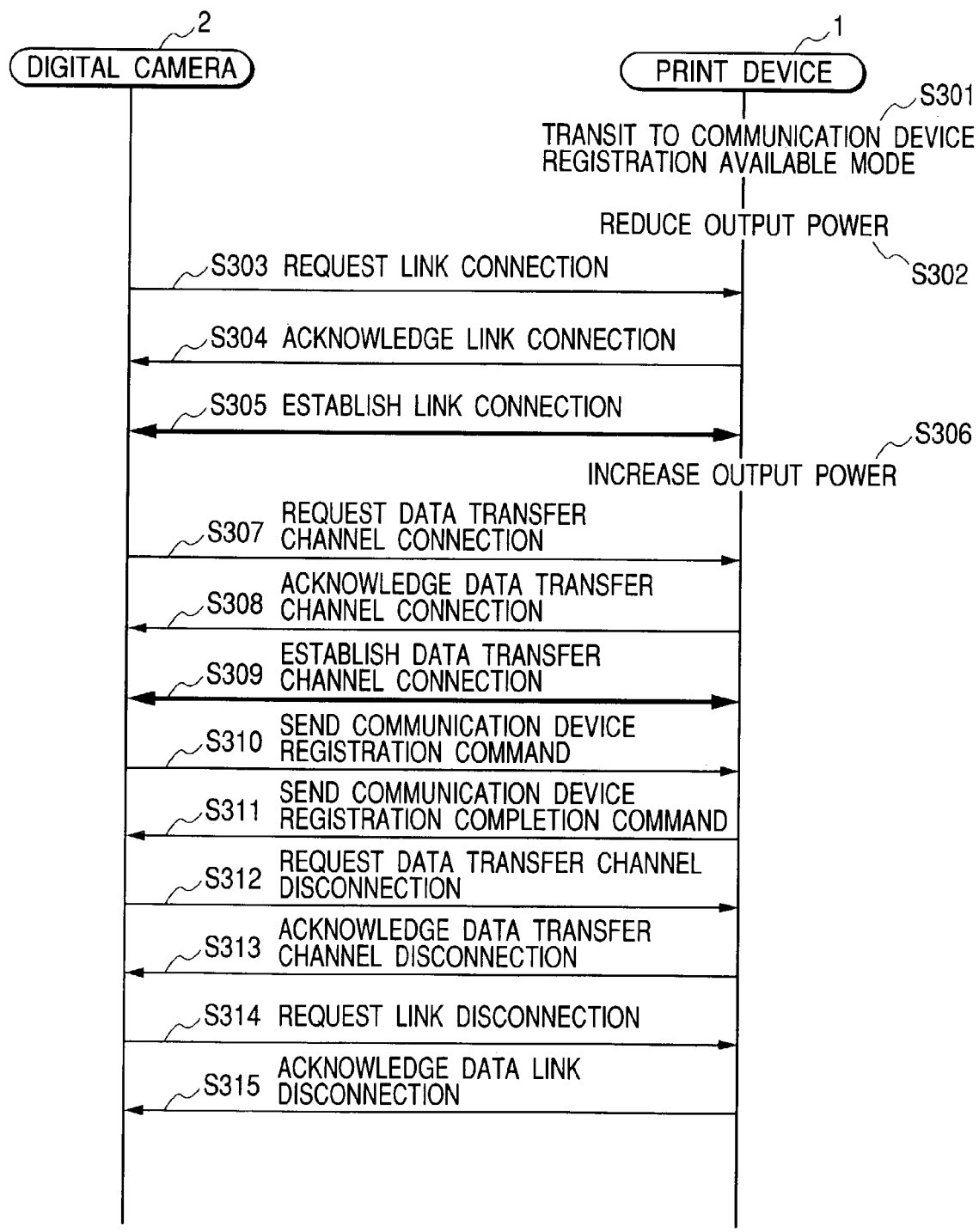
FIG. 3 is a timing chart for showing operations of registering a BD_ADDR in the print device according to the embodiment of the present invention.

FIG. 3 is a timing chart for showing the operations of registering a BD_ADDR in the print device 1.

Figure 4:
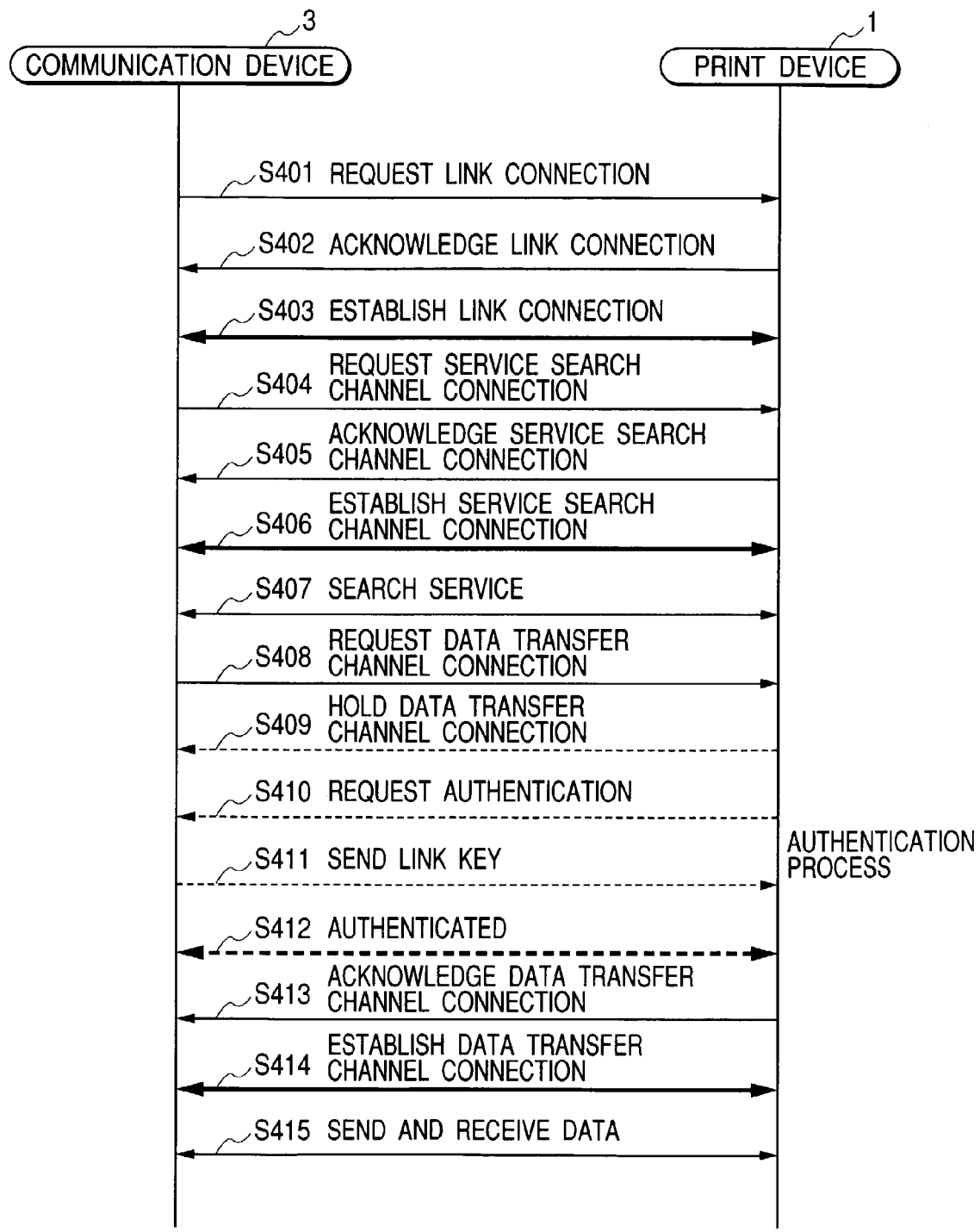
FIG. 4 is a timing chart for showing operations of message exchange between the print device and a communication device and a print processing by the print device according to the embodiment of the present invention.

FIG. 4 is a timing chart for showing operations of receiving print data for print processing.

Figure 5B:
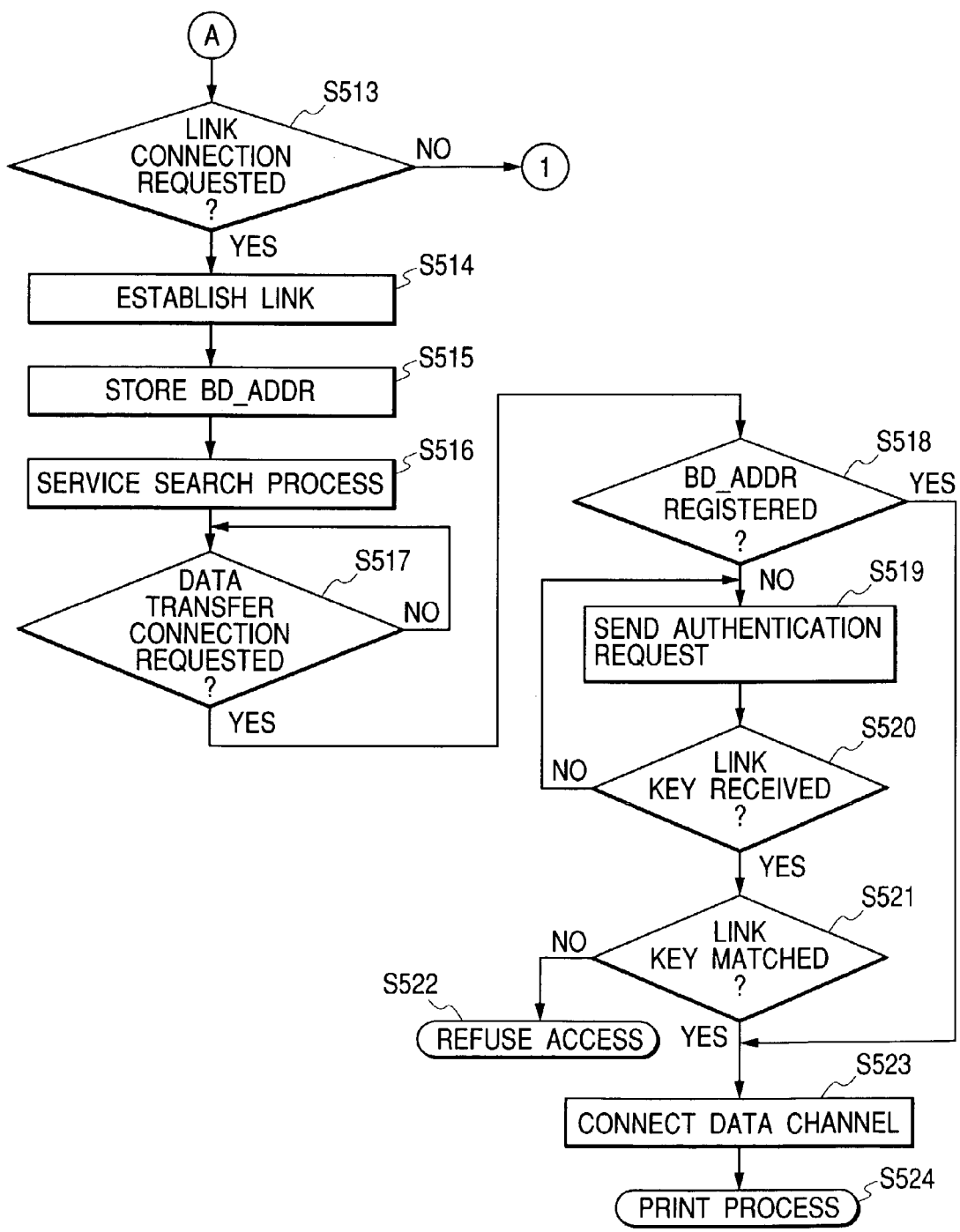
FIG. 5, composed of FIGS. 5A and 5B, is a flowchart for showing operations of a print device according to an embodiment of the present invention.
Figure 6:
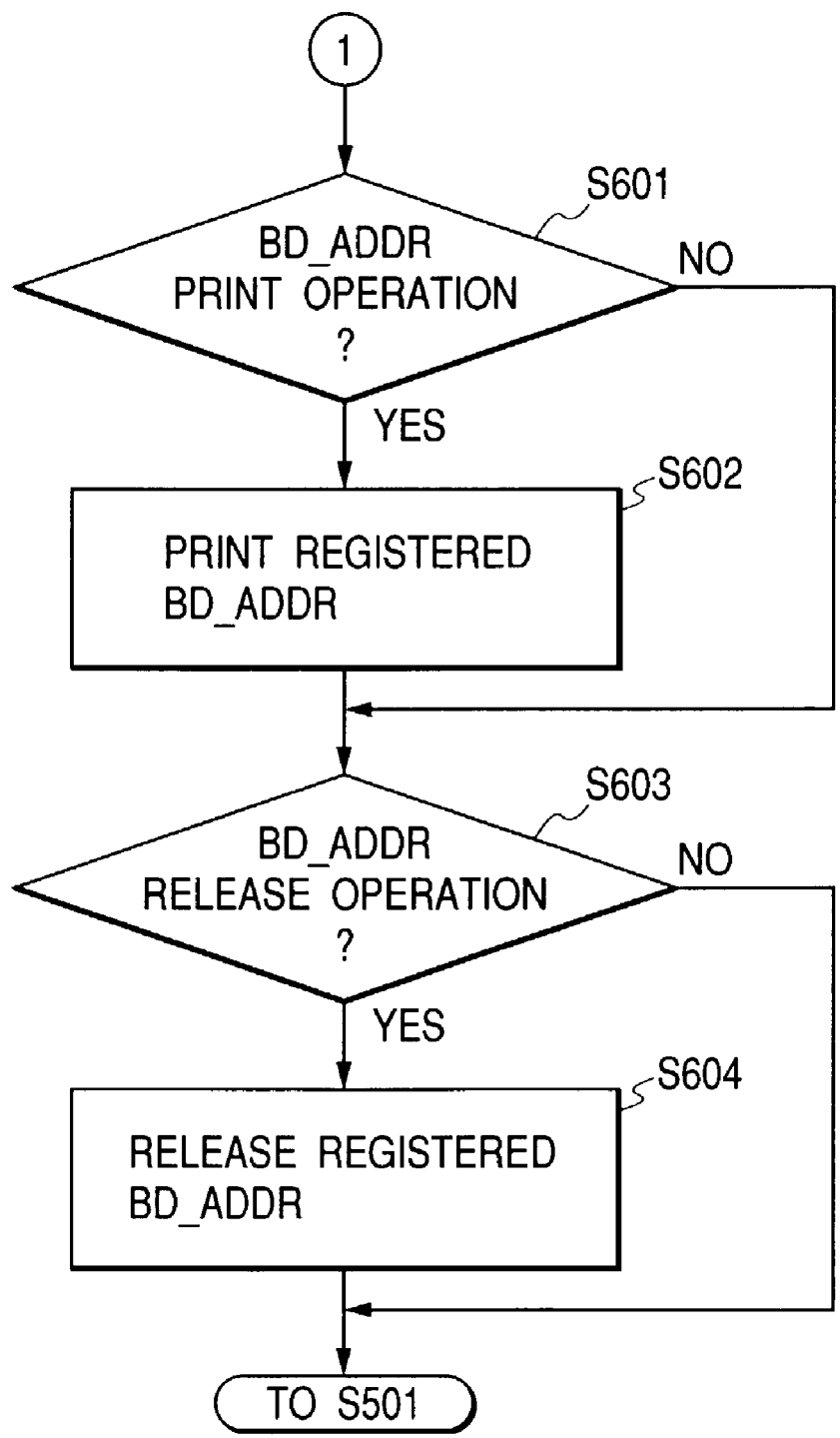
FIG. 6 is another flowchart for showing operations of the print device according to the embodiment of the present invention.

FIGS. 5A, 5B and 6 are flowcharts for showing operations of the print device 1.

First, the process sets the print device 1 into a communication device registration available mode (BD_ADDR registration mode) (S301, S501). To set it into the communication device registration available mode, the user performs such an unusual special operation as holding down the RESUME key on the print device 1 for at least 10 seconds, specifically pressing a plurality of keys in combination, applying power in accordance with a specific method, or operating a variety of detection sensors accompanying printing.

Besides, the print device 1 may be set into the registration available mode by sending a predetermined specific command using wireless or cable communication.

It is to be noted that in the communication device registration available mode, a predetermined communication device can be registered.

When this mode transition operation has been performed to set the print device 1 into the communication device registration available mode, its wireless communication I/F control unit 102 posts an output-power reduction instruction via the base band to the RF unit 107, which then reduces the output power (transmission power) (S302, S502). By reducing the output power of the print device 1, the print device 1 enters a state where it cannot communicate with a remote communication device.

Next, even when the output power is thus reduced, the process operates the digital camera 2 within a range where a radio wave can reach, to request the print device 1 for link-connection (S303). When having received a link-connection request command sent for link-connection (S503), the print device 1 temporarily stores a BD_ADDR included in the link-connection request command in the non-volatile memory 103 and also acknowledges the link-connection request command (S304), to establish link-connection between itself and the digital camera 2 (S305, S504).

When link-connection is established, the print device 1 restores ordinary output power to secure reliabilities of data communication (S306, S505).

Thereafter, the digital camera 2 requests connection to a data transfer channel (S307); when this request is received by the print device 1 (S506), it returns acknowledgement to this request (S308) to establish data transfer channel connection between itself and the digital camera 2 (S309, S507), thus enabling mutual data transmission and reception.

When the predetermined communication device registration command sent through this data transfer channel from the digital camera 2 has been received (S310, S508), the process temporarily registers in the non-volatile memory 103 the BD_ADDR of a currently link-connected communication device (that is, the BD_ADDR temporarily stored upon reception of the link-connection request command) (S509). Furthermore, a BD_ADDR of any communication device other than the link-connected digital camera 2 may also be intended to be able to be registered by including this BD_ADDR in a communication device registration command.

When the BD_ADDR of the communication device has been registered, the print device 1 sends a predetermined registration completion command to the digital camera 2 (S311, S510) to notify it of completion of registration.

When having received the registration completion command, the digital camera 2 sends a data transfer channel disconnection request to the print device 1. When having received the data transfer channel disconnection request (S312, S511), the print device 1 returns acknowledgement to disconnect the data transfer channel (S313). Then, when having received a link disconnection request (S314), the print device 1 sends acknowledgement (S315) to disconnect link connection (S315, S512), thus releasing the communication device registration available mode.

It is to be noted that it is intended such that if the print device 1 is link-connected with one communication device when it is in the communication device registration available mode, the print device 1 may refuse a link connection request sent from any other communication devices. By doing so, it is possible to prevent a BD_ADDR of an unintended partner from being registered.

Alternatively, it may be intended such that if a BD_ADDR of a link-connected partner is registered, it would release the registration available mode to return to the ordinary mode. By doing so also, it is possible to prevent a BD_ADDR of an unintended partner from being registered.

Furthermore, it may also be intended such that by enabling link-connecting to a plurality of communication devices in the communication device registration available mode, the BD_ADDR's of all the link-connected devices would be stored and registered when the digital camera 2 sends a predetermined special command. In this case, even if a communication device cannot send the predetermined communication device registration command, its BD_ADDR can be registered and set in the print device 1.

Next, a flow is described for processing of interconnection of a communication device 3 and the print device 1, with reference to FIGS. 4 and 5.

When having received a link-connection request from the communication device 3 (S401, S513), the print device 1 returns acknowledgement (S402) to establish link-connection (S403, S514). Since the link-connection request command includes a BD_ADDR which indicates an address unique to the communication device 3, the print device 1 stores this BD_ADDR (S515).

Next, when the communication device 3 requests connection through a service search channel (S404) and it is acknowledged by the print device 1 (S405), service search channel connection is established (S406) Through this channel, a service is searched for from the communication device 3, to post a service of the print device 1 (S407, S516).

When data transfer channel connection is requested in order to operate the print device 1 (S408, S517), the print device 1 compares the BD_ADDR of the connected communication device 3 (that is, BD_ADDR stored at S515) and that registered in the non-volatile memory 103 to each other (S518). If the BD_ADDR of the connected communication device 3 is decided not to have been registered, the process performs authentication processing of steps S409 to S412 and S519 to S521. The process does not perform the authentication processing (S409 to S412, S519 to S521) on the registered communication device 3 but returns acknowledgement to the data transfer channel connection request (S413).

If the communication device 3 is not registered, the process responds to it by holding a connection request for the data transfer channel (S409) and sends to the communication device a command for an authentication request (S410, S519).

When having received the authentication request, the communication device 3 creates a link key using a PIN code and a BD_ADDR and posts the created link key to the print device 1 (S411). When having received the link key (S520), the print device 1 compares the received link key to a link key which is calculated on the basis of a PIN code stored in the non-volatile memory 103 and a BD_ADDR stored at S515 (S521). If these link keys match each other as a result of this comparison, the process establishes authentication (S412). Otherwise, the process does not establish authentication and returns negative acknowledgement to connection, thus performing disconnection processing (S522).

Furthermore, when authentication with the communication device 3 is established or if a result of comparison at step S518 indicates that the communication device 3 is already registered (in the case where the communication device 3 is the digital camera 2 in the present embodiment), the print device 1 acknowledges the data transfer channel connection request of step S408 or S517 (S413), to establish connection with the data transfer channel (S414, S523). Then, through the data transfer channel thus established, various kinds of data such as print data, response data, and status response data is sent and received between the print device 1 and the communication device 3 (S415), so that the print device 1 performs print processing in accordance with the data (S524).

Furthermore, at S601 in FIG. 6, the process decides whether a special operation of the print device 1 or a command received thereby has instructed printing of a registration condition of BD_ADDR's. If such is the case, the process prints the BD_ADDR's registered in the non-volatile memory 103 using the communication device registration available mode (S602). The user confirms the registration condition of the printed BD_ADDR's and, if any one of these registered BD_ADDR's is found not to be intended, performs a special operation on the print device 1 in order to release this unintended BD_ADDR registered. When having recognized this operation (S603), the print device 1 releases the registered BD_ADDR (S604). In such a manner, it is possible to prevent connection with an unintended partner from being established readily and also to improve convenience relating to registration.

It is to be noted that although in the above description the BD_ADDR of the digital camera 2 has been registered in the print device 1, the above-mentioned processing on the print device 1 or the digital camera 2 may be applied to a wireless communication device other than the print device 1 and the digital camera 2.

In the present embodiment, any partner whose BD_ADDR has been registered in the communication device registration available mode is intended to be communicable without being authenticated by establishing data transfer channel connection, so that any device having a difficulty in key-input can be connected as a partner with security as insured.

Furthermore, even a potential partner whose BD_ADDR is yet to be registered can be communicative because it is authenticated using a PIN code.

Furthermore, by reducing output power prior to link-connection requesting in a mode for registering devices to be engaged in communication, it is possible to register only communication devices nearby and exclude the other remote ones. Accordingly, security-related management becomes easy in registration work.

Furthermore, by restoring an original output power after link connection is established, it is possible to register a communication device stably, thus improving convenience of the communication device.

Furthermore, even if a preset PIN code is forgotten, safe and simple communication is possible.

Furthermore, even a partner which is incapable of entering of a PIN code or difficult to do so can be communicated with safely and simply.

Furthermore, since a registered BD_ADDR is intended to be able to be printed, it can be confirmed and even released, thus further improving security management.

SECOND EMBODIMENT

The present embodiment does not reduce output power in contrast to the first embodiment in which when the print device 1 is set into the communication device registration available mode, the output power is reduced and, after link connection is established, restored to its original value.

Specifically, at S501 in FIG. 5A, when the print device 1 is set into the communication device registration available mode, the process goes to step S503. When link connection is established between the print device 1 and the digital camera 2 (S504) and then goes to step S506.

Nevertheless, as in the case of the first embodiment, any potential partner whose BD_ADDR is already registered in the communication device registration available mode can be connected to be communicable without being authenticated by establishing data transfer channel connection, so that any device having a difficulty in key-input can be connected easily as a partner with security as insured.

Furthermore, even a potential partner whose BD_ADDR is yet to be registered can be communicative because it is authenticated using a PIN code.

Furthermore, even if a preset PIN code is forgotten, safe and simple communication is possible.

Furthermore, even a partner which is incapable of entering a PIN code or difficult to do so can be communicated with safely and simply.

Furthermore, a registered BD_ADDR is intended to be able to be printed, so that it can be confirmed and even released, thus further improving security management.

THIRD EMBODIMENT

Figure 7:
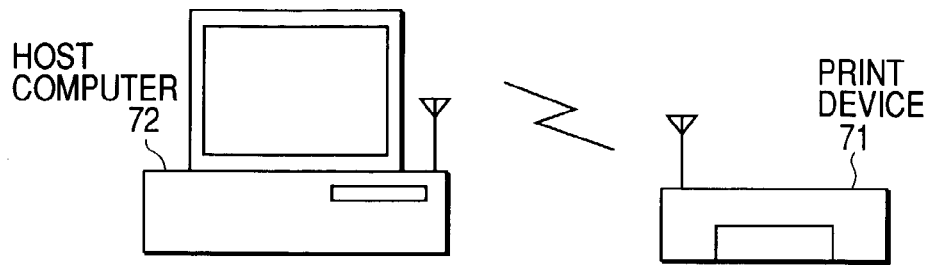
FIG. 7 is a diagram for showing a print device and a host computer according to an embodiment of the present invention.

FIG. 7 is a diagram for showing a print device 71 and a host computer 72 according to one embodiment of the present invention.

Figure 8:
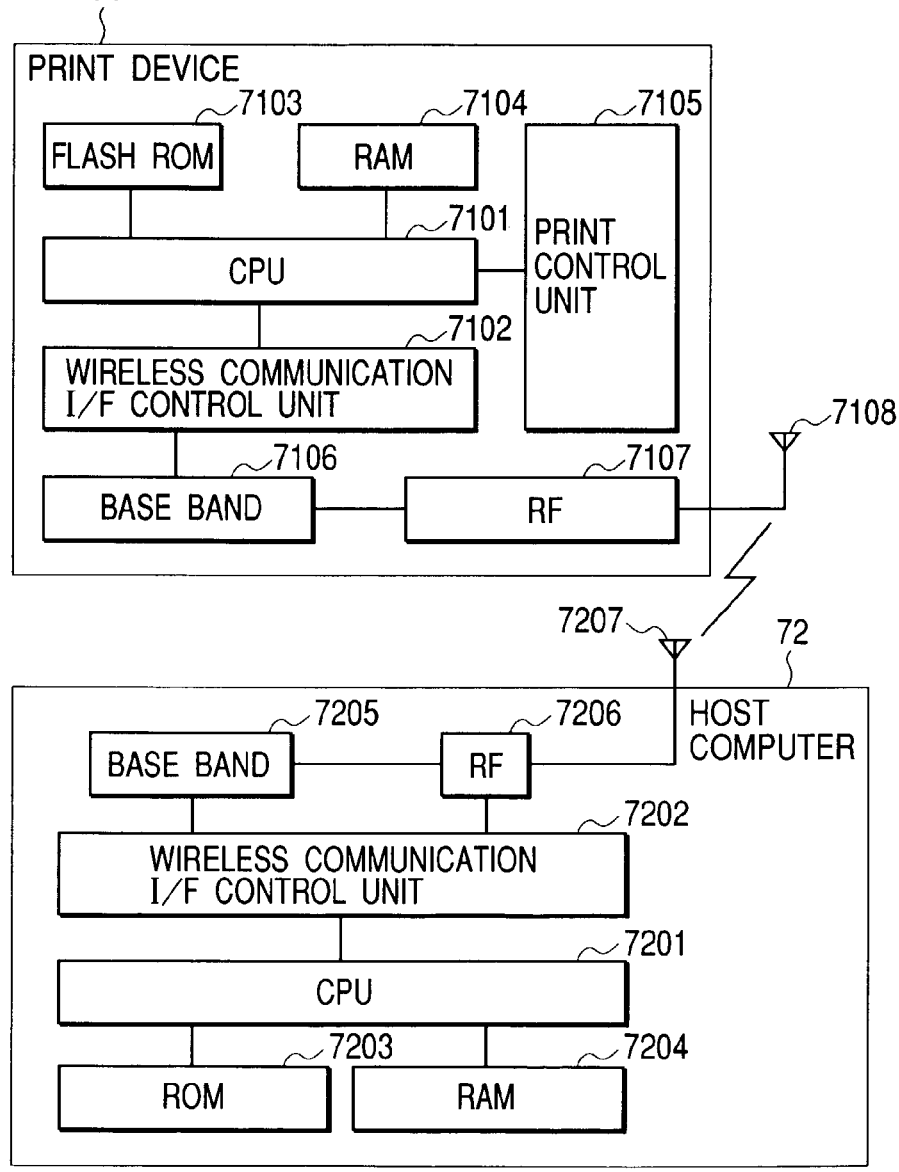
FIG. 8 is a block diagram for showing the print device and the host computer according to the embodiment of the present invention.

FIG. 8 is a block diagram for specifically showing the print device 71 and the host computer 72.

The print device 71, like the print device 1 shown in FIG. 2, has a print control unit 7105 which prints data, a CPU7101, a flash ROM7103, a RAM7104, and a wireless unit comprised of a wireless communication I/F control unit 7102 for performing Bluetooth communication, a base band unit 7106, an RF unit 7107, and an antenna 7108.

The host computer 72 has a CPU7201, a ROM7203, a RAM7204, and a wireless unit comprised of a wireless communication I/F control unit 7202 for performing Bluetooth communication, a base band unit 7205, an RF unit 7206, and an antenna 7205; in this configuration, the host computer 72 sends a variety of kinds of print data and control data to and receives them from the print device 71 through the wireless unit in Bluetooth communication. Furthermore, the host computer 72 is provided with a key-input device (not shown), an output device (not shown) such as a monitor, and a hard disk (not shown).

In the present embodiment, a PIN code preset in the print device 1 is intended to be able to be altered.

To transit the print device 1 into a PIN code set mode, the user performs such an unusual special operation as holding down the RESUME key on the print device 71 for at least 10 seconds, specifically pressing a plurality of keys in combination, applying power in accordance with a specific method, or operating a variety of detection sensors accompanying printing.

Besides, the print device 71 may be transited into the PIN code set mode by sending a predetermined specific command using wireless or cable communication. It is to be noted that in the PIN code set mode, by reducing output power (transmission power) of the RF unit 7107, it is possible to exclude connection from a communication device which the radio wave does not reach.

Next, operations are described for registering a PIN code in the print device 71 in the PIN code set mode.

Figure 9:
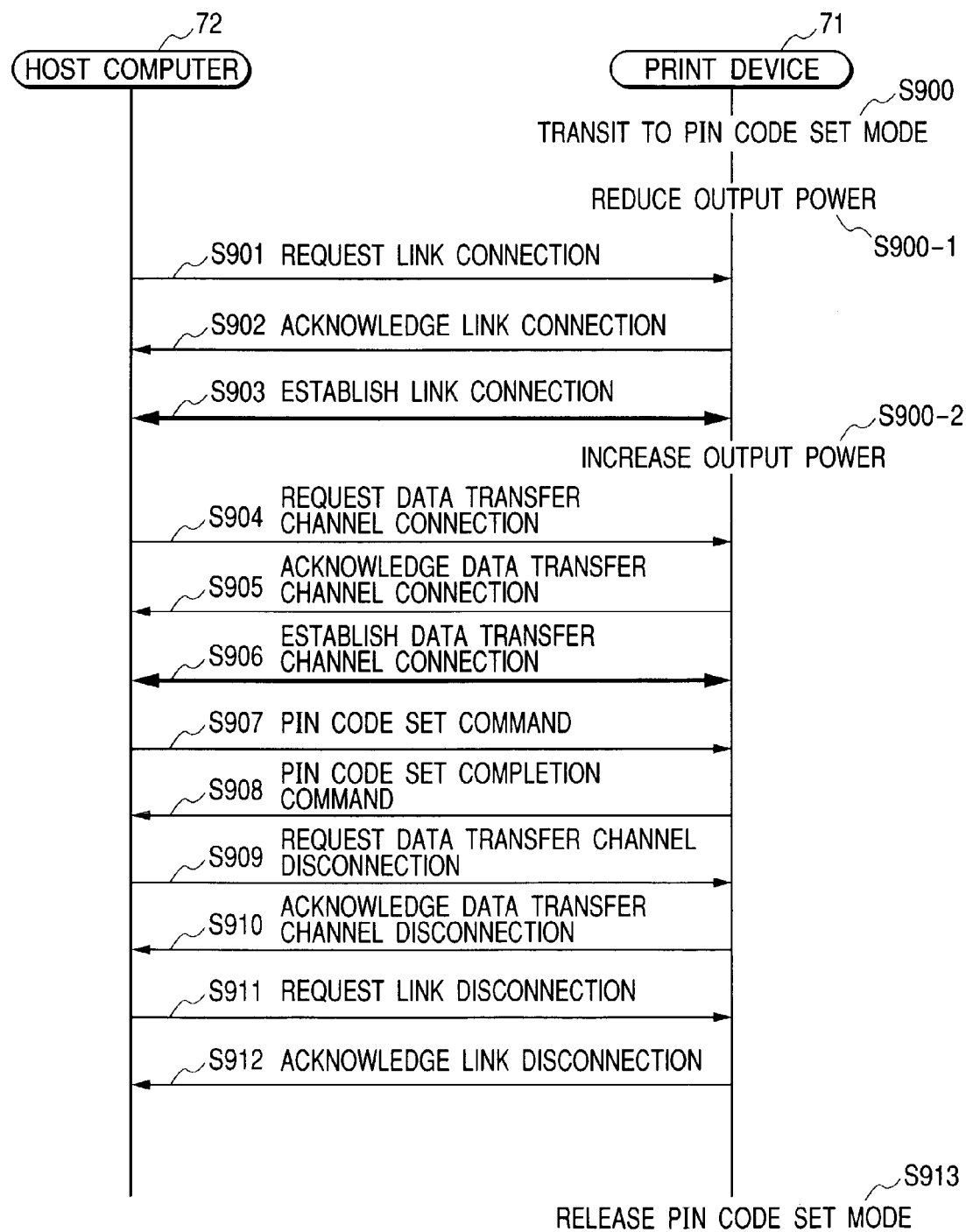
FIG. 9 is a timing chart for showing operations of registering a PIN code in the print device in a PIN code set mode according to the embodiment of the present invention.

FIG. 9 is a timing chart for showing operations of registering a PIN code in the print device 71 in the PIN code set mode.

Figure 10:
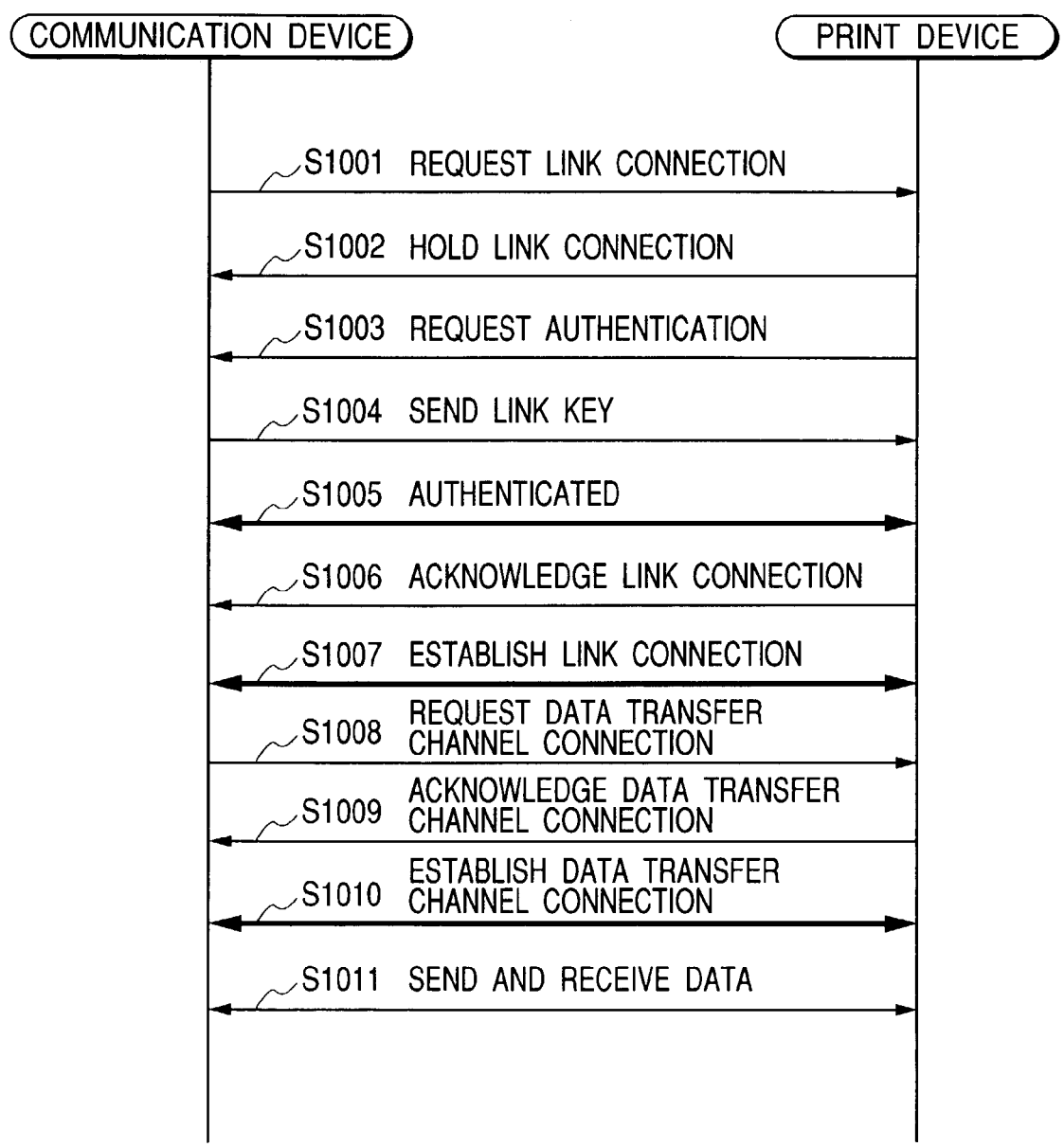
FIG. 10 is a timing chart for showing operations, by the print device according to the embodiment of the present invention, of performing authentication using a preset PIN code for starting communication.

FIG. 10 is a timing chart for showing operations of performing authentication using a preset PIN code for starting communication.

Figure 11B:
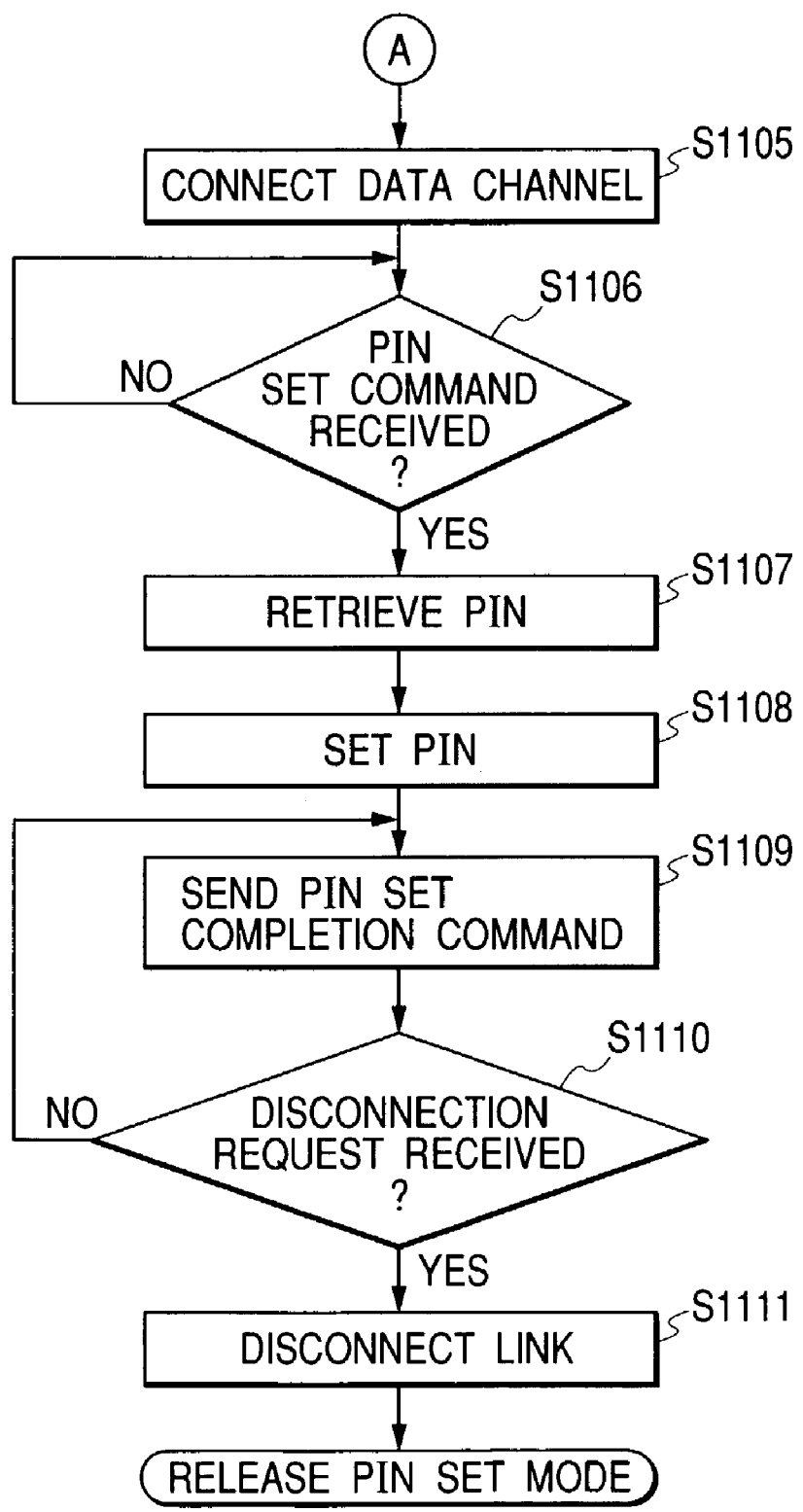
FIG. 11, composed of FIGS. 11A and 11B, is a flowchart for showing operations of the print device according to the embodiment of the present invention.

FIGS. 11A and 11B are flowcharts for showing operations of the print device 71.

First, the process sets the print device 71 into the PIN code set mode (S900, S1101).

To transit the print device 71 into the PIN code set mode, the user performs such an unusual special operation as holding down the RESUME key on the print device 71 for at least 10 seconds, specifically pressing a plurality of keys in combination, applying power in accordance with a specific method, or operating a variety of detection sensors accompanying printing.

Besides, the print device 71 may be transited into the PIN code set mode by sending a predetermined specific command using wireless or cable communication.

When the print device 71 is transited into the PIN code set mode, the process reduces the output power (transmission power) of the RF unit 7107 (S900-1). By doing so, it-is possible to narrow a range within which the radio wave can reach, thus excluding connection from a remote communication device which the radio wave cannot reach.

Then, when the host computer 72 is operated to request the print device 71 for link-connection, the print device 71 receives a link-connection request (S901, S1102). The print device 1 returns acknowledgement to the link-connection request (S902), to establish link-connection (S903, S1103).

When link-connection is established, the print device 71 restores ordinary output power to secure reliabilies of data communication (S900-2).

Then, the host computer 72 requests connection to a data transfer channel; and, when this request is received by the print device 71 (S904, S1104), it returns acknowledgement to this request to accept it (S905) in order to establish data transfer channel connection (S906, S1105), thus enabling mutual data transmission and reception.

Through this data transfer channel thus established, the host computer 72 sends a predetermined PIN code set command including a PIN code (S907). When having received this PIN code set command (S1106), the print device 71 extracts the PIN code (S1107) and sets this extracted PIN code as a fixed PIN code into the non-volatile memory 103 (S1108). When this setting is completed, the print device 71 sends a predetermined PIN code set completion command to the host computer 71 (S908, S1109), to notify the host computer 72 of the completion of setting of the PIN code.

When having received the PIN code set completion command, the host computer 72 sends a data transfer channel disconnection request to the print device (S909). When having received this disconnection request (S1110), the print device 71 acknowledges this disconnection request (S910), to disconnect the data transfer channel. Finally, the host computer 72 requests the print device 71 to disconnect link-connection (S911); then, the print device 71 acknowledges the link disconnection request (S912), to disconnect link-connection (S1111). When link-connection is disconnected, the print device 71 releases the PIN code set mode (S913), to create a link key using the set fixed PIN code for any subsequent link-connection request and request its authentication.

It is to be noted that when having transited into the PIN code set mode, the print device 71 is link-connected with only one communication device to refuse a link-connection request from any other communication devices. Furthermore, when a PIN code from the one communication device thus link-connected is set, the print device 71 releases the PIN code set mode to return to the ordinary mode. By dosing so, it is possible to prevent a PIN code sent from an unintended partner from being set.

Furthermore, when having received a link-connection request from the host computer 72 or any other communication device when it is in a stand-by mode (S1001, S1112), the print device 71 gives a hold response for the link-connection request to the communication device which has sent the link-connection request (S1102).

Then, when having sent an authentication request to this communication device (S1003, S1113) and received a link key from this communication device created using the PIN code and a BD_ADDR (S1004, S1114), the print device 71 compares the received link key to a link key created on the basis of the fixed PIN code set in the non-volatile memory 103 of the print device 71 and a BD_ADDR (S1115). If the comparison results indicates that the received link key and the created link key have matched each other, authentication is established in mutual link-connection (S1005).

When authentication is established, the print device 71 returns acknowledgement to the held link-connection request (S1006), to establish link-connection (S1007).

When link-connection is established in such a manner, the communication device requests the print device 71 to connect the data transfer channel (S1008); and, when the print device 71 returns acknowledgement to the request (S1009), data transfer channel connection is established (S1010, S1116). Then, through the channel, data transfer is performed bilaterally (S1011).

Furthermore, if a link key is not received during a predetermined time after transmission of an authentication request at step S1113 (S1114, S1117) or the result of comparison at step S1115 indicates mismatch of the link keys, negative acknowledgement is returned to the connection, thus performing disconnection processing.

According to this embodiment, it is possible to alter a PIN code of a device which has no input unit for setting of the PIN code or is difficult to do so. Furthermore, in the PIN code set mode, link-connection is possible without authentication, so that even if a PIN code is forgotten, link-connection can be established to re-set the PIN code, thus providing better convenience and improved security effects.

Furthermore, the print device 71 is intended to be link-connected with only one communication device when it has transited into the PIN code set mode and refuse any link-connection request from any other communication devices, so that it is possible to prevent a PIN code sent from an unintended partner from being set.

Furthermore, when a PIN code from the one communication device thus link-connected is set, the print device 71 releases the PIN code set mode to return to the ordinary mode, so that it is possible to prevent a PIN code sent from an unintended partner from being set.

FOURTH EMBODIMENT

The present embodiment enables registering a BD_ADDR and a PIN code in a print device, thus providing a device having better convenience and an improved security effect.

It is to be noted that the print device of the present embodiment has the same configuration as that of the above-mentioned print devices 1 and 71 and so its description is omitted.

Figure 12:
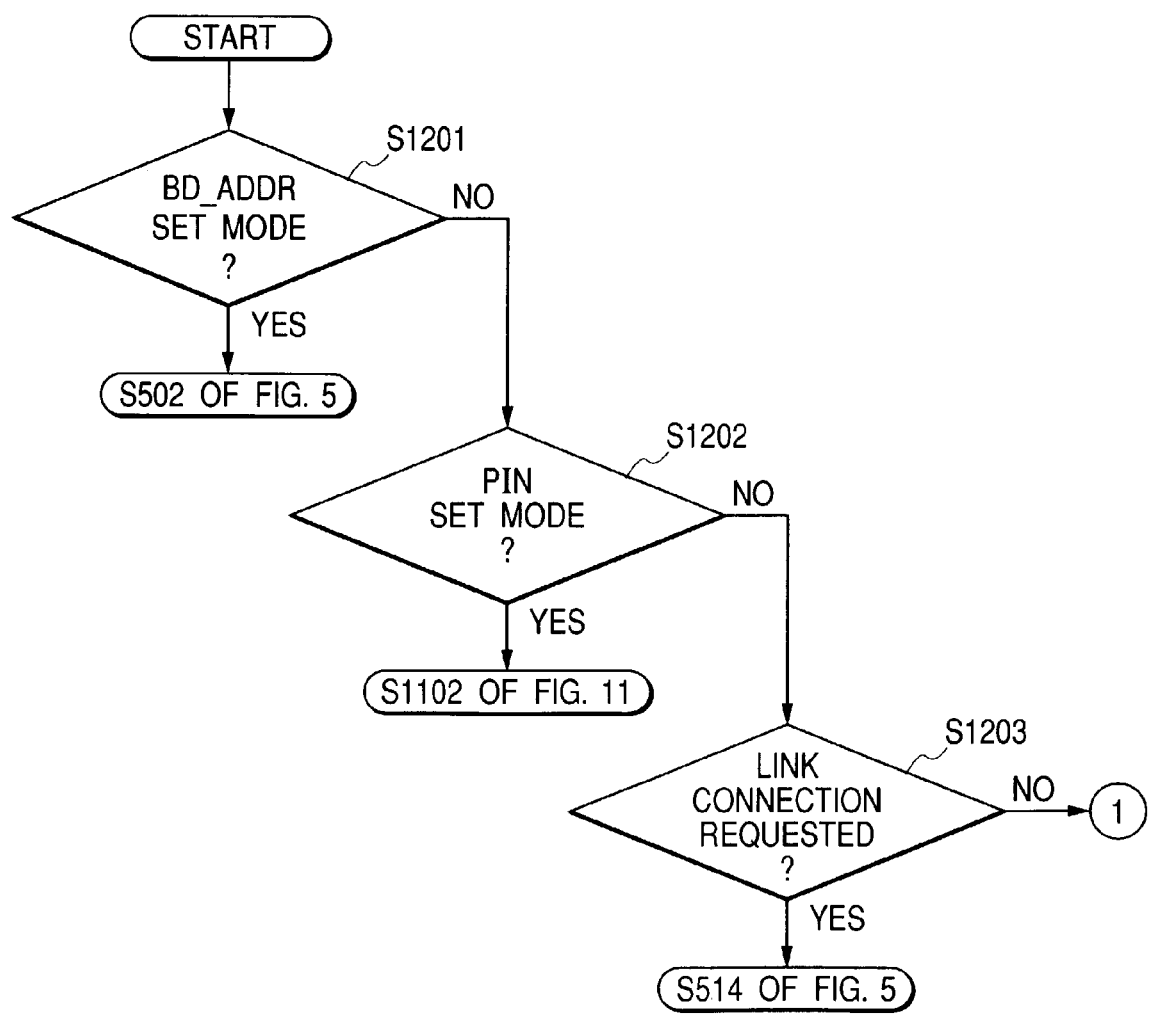
FIG. 12 is a flowchart for showing operations of a print device according to an embodiment of the present invention.

FIG. 12 is a flowchart for showing operations of a print device of the present embodiment.

At step S1201, the print device decides whether an operation of setting the BD_ADDR registration mode has been performed. If a decision result indicates that the BD_ADDR registration mode is already set, the process goes to step S502 shown in FIG. 5A to perform the same operations as those of step S502 and the subsequent described with the first embodiment.

Furthermore, at step S1202, the process decides whether an operation of setting the PIN code set mode has been performed. If a decision result indicates that the PIM code set mode setting operation has already been performed, the process goes to step S1102 to perform the same operations as those of step S1102 of FIG. 11A and the subsequent described with the third embodiment. Furthermore, if neither the BD_ADDR registration mode setting nor PIN code set mode setting operation has been performed and a link-connection request is received from any other communication device (S1203), the process performs the same operations as those of step S514 and the subsequent described with the first embodiment; if no link-connection request has been received either, the process goes to S601 of FIG. 6 described with the first embodiment to decide whether the BD_ADDR printing and BD_ADDR releasing operations have been performed and, in accordance with the decision results, prints a BD_ADDR or releases it.

By doing so, it is possible to improve the convenience and the security effect.

It is to be noted that although the embodiments have been described above using a print device, a digital camera, and a host computer as an example, processing for these print device, digital camera, and host computer may be applied to any other wireless communication devices.

Thus, by the present invention, even a device which has no input unit or is difficult in key-input can be simply connected with a partner with a high security level insured. Furthermore, the convenience of the device can also be improved.

What is claimed is:

1. A communication apparatus comprising:
    mode set unit adapted to set a registration mode for registering information received from a partner apparatus;
    power decrease unit adapted to decrease communication power when the registration mode is set by said mode set unit;
    connection unit adapted to connect with the partner apparatus after the communication power is decreased by said power decrease unit;
    power increase unit adapted to increase the communication power after being connected by said connection unit;
    reception unit adapted to receive an instruction for registration of information from the partner apparatus connected by said connection unit, after the communication power is increased by said power increase unit; and
    registration unit adapted to register the information received from the partner apparatus in accordance with the instruction received by said reception unit.

2. A communication apparatus according to claim 1, wherein said registration unit registers identification information of the partner apparatus.

3. A communication apparatus according to claim 1, wherein said registration unit registers the information received before the communication power is increased by said power increase unit.

4. A communication apparatus according to claim 1, wherein said registration unit registers authentication information for authenticating.

5. A communication apparatus according to claim 1, wherein said registration unit registers the information received after the communication power is increased by said power increase unit.

6. A communication apparatus according to claim 1, wherein said connection unit establishes a link connection with the partner apparatus and a data communication channel connection with the partner apparatus, establishes a link connection with the partner apparatus after the communication power is decreased by said power decrease unit, and establishes a data communication channel connection with the partner apparatus after the communication power is increased by said power increase unit.

7. A communication apparatus according to claim 1, wherein the communication power is transmission power.

8. A communication apparatus according to claim 1, wherein, when said connection unit connects with one communication apparatus after the communication power is decreased by said power decrease unit, said connection unit rejects a connection with other communication apparatuses.

9. A communication apparatus according to claim 1, wherein said registration unit registers information of other apparatuses in accordance with an instruction from the partner apparatus.

10. A communication apparatus according to claim 9, wherein the information of the other apparatuses is sent with the instruction for registration of information of the partner apparatus.

11. A communication apparatus according to claim 9, wherein the information of the other apparatuses is information of the apparatus which is connected after the communication power is decreased by said power decrease unit.

12. A communication apparatus according to claim 1, further comprising:
   authentication unit adapted to execute authentication process with a connecting partner apparatus;
   wherein said connection unit connects with the partner apparatus without executing said authentication process when said registration mode is set.

13. A communication apparatus comprising:
   mode set unit adapted to set a registration mode for registering information received from a partner apparatus;
   communication area reduction unit adapted to reduce communication area when the registration mode is set by said mode set unit;
   connection unit adapted to connect with the partner apparatus after the communication area is reduced by said communication area reduction unit;
   communication area expansion unit adapted to expand the communication area after being connected by said connection unit;
   reception unit adapted to receive an instruction for registration of information from the partner apparatus connected by said connection unit, after the communication area is expanded by the communication area expansion unit; and
   registration unit adapted to register the information received from the partner apparatus in accordance with the instruction received by said reception unit.

14. A method of registering information, comprising:
   a power decrease step of decreasing communication power when a registration mode for registering information received from a partner apparatus is set;
   a connection step of connecting with the partner apparatus after the communication power is decreased in said power decrease step;
   a power increase step of increasing changing the communication power after being connected in said connection step;
   a reception step of receiving an instruction for registration of information from the partner apparatus connected in said connection step, after the communication power is increased in said power increase step; and
   a registration step of registering the information received from the partner apparatus in accordance with the instruction received in said reception step.

15. A method of registering information, comprising:
   a communication area reduction step of reducing communication area when a registration mode for registering information received from a partner apparatus is set;
   a connection step of connecting with the partner apparatus after the communication area is reduced in said communication area reduction step;
   a communication area expansion step of expanding the communication area after being connected in said connection step;
   a reception step of receiving an instruction for registration of information from the partner apparatus connected in said connection step, after the communication area is expanded in said communication area expansion step; and
   a registration step of registering the information received from the partner apparatus in accordance with the instruction received in said reception step.

* * * * *

UNITED STATES PATENT AND TRADEMARK OFFICE
CERTIFICATE OF CORRECTION

PATENT NO. : 7,224,802 B2
APPLICATION NO. : 10/354640
DATED : May 29, 2007
INVENTOR(S) : Hosaka It is certified that error appears in the above-identified patent and that said Letters Patent is hereby corrected as shown below:

In Column 12, Line 19, delete "changing".

Signed and Sealed this

Tenth Day of June, 2008

JON W. DUDAS
*Director of the United States Patent and Trademark Office*